United States Patent [19]
Roeder et al.

[11] 4,063,914
[45] Dec. 20, 1977

[54] METHOD OF PRODUCING AN OPTICAL FIBER

[75] Inventors: Erwin Roeder; Edmund Steinbeck, both of Aachen, Germany

[73] Assignee: U.S. Philips Corporation, New York, N.Y.

[21] Appl. No.: 769,008

[22] Filed: Feb. 16, 1977

Related U.S. Application Data

[63] Continuation of Ser. No. 620,298, Oct. 7, 1975, abandoned.

[30] Foreign Application Priority Data

Oct. 10, 1974 Germany .................... 2448363

[51] Int. Cl.² ........................................ C03B 37/02
[52] U.S. Cl. ................................ 65/2; 65/3 A; 65/13; 65/121; 264/171; 425/378 R
[58] Field of Search ............ 72/258, 468, 264, 255; 425/378 R, 378 S; 264/171; 65/1, 2, 3 A, 3 R, 13, 121, 144; 29/187.5

[56] References Cited

U.S. PATENT DOCUMENTS

| 1,581,829 | 4/1926 | Beny .................. 65/144 X |
| 2,149,905 | 3/1939 | Zückert .............. 264/171 X |
| 3,205,692 | 9/1965 | Kemppinen et al. ........ 72/264 |
| 3,362,803 | 1/1968 | Dannohl et al. ............ 65/13 |
| 3,503,844 | 3/1970 | Clement ............ 264/171 X |
| 3,522,721 | 8/1970 | Whiting ................ 72/255 |
| 3,865,564 | 2/1975 | Jaeger et al. ......... 65/13 X |

FOREIGN PATENT DOCUMENTS 1,194,386  8/1970  United Kingdom ......... 65/3 A

Primary Examiner—Robert L. Lindsay, Jr.
Attorney, Agent, or Firm—Frank R. Trifari; David R. Treacy

[57] ABSTRACT

A method of and a device for a simultaneous extrusion of multi-component co-axial rods with very uniform, centered cores. A block of cladding material has core material co-axially contained in the geometric relationship desired for the ultimate product, and extrusion is by pressure opposite to the direction of material flow.

4 Claims, 1 Drawing Figure

U.S. Patent
Dec. 20, 1977
4,063,914
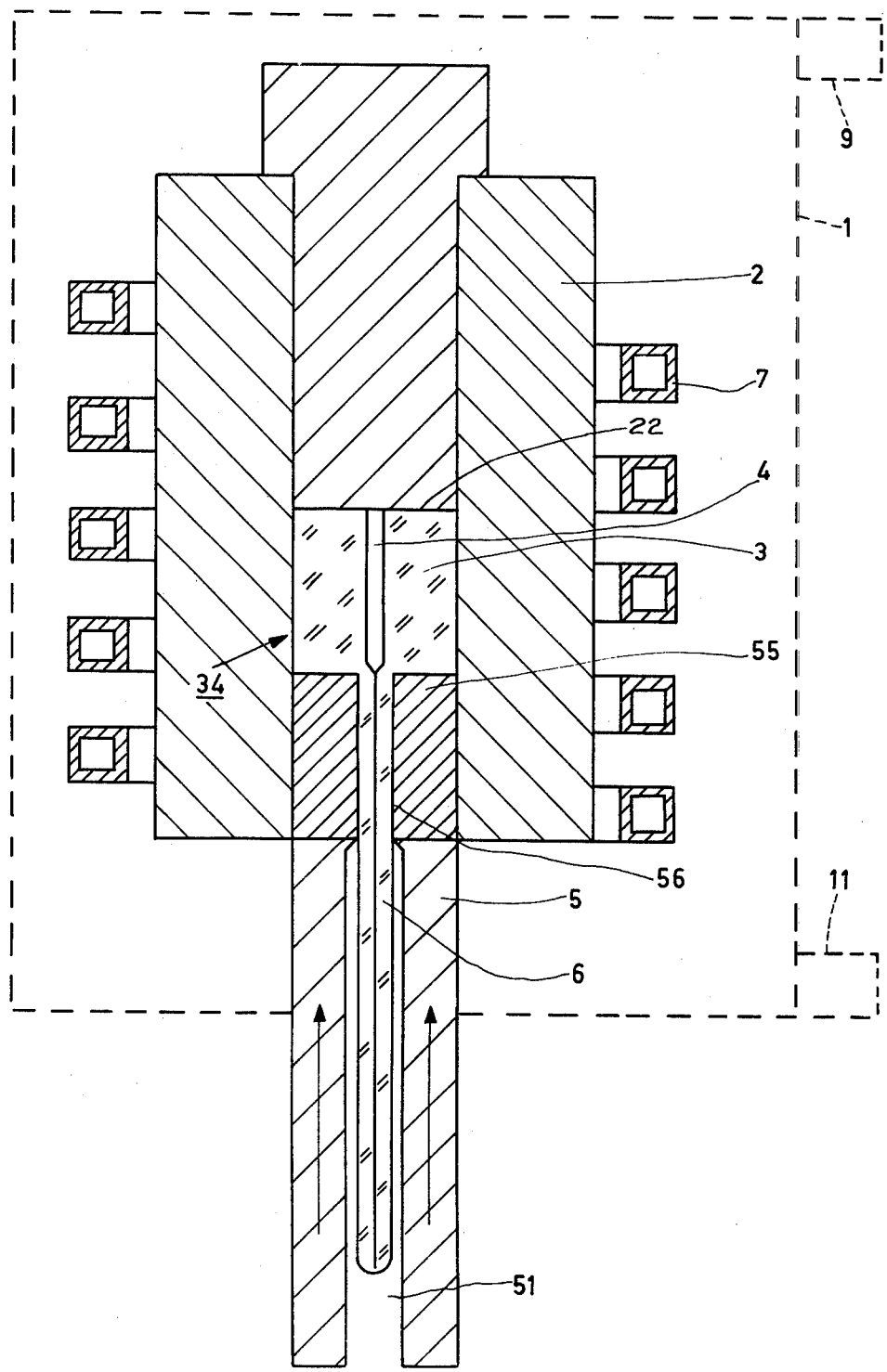

METHOD OF PRODUCING AN OPTICAL FIBER

This is a continuation, of application Ser. No. 620,298, filed Oct. 7, 1975, now abandoned.

The invention relates to a method of extruding multi-component material, notably inorganic glasses, and furthermore relates to a device for performing the method. During the extrusion of multi-component material, the material to be processed is not uniform, but is rather composed of several individual masses having different characteristics in a given geometric configuration.

British Patent Specification 1,194,386 describes a method of simultaneously extruding two different kinds of glass to produce composite glass rods which consist of a core of the one kind of glass and a cladding of the second kind of glass. According to this known method, first a block of cladding glass is placed in a reservoir. The core glass, in the form of a small sphere or disk, is subsequently placed in the reservoir on the side of the block of cladding glass which is remote from the die. Cladding glass and core glass are heated together and are extruded to form a strand which is discharged via the die opening. The required extrusion pressure is transferred to the glass by way of a graphite die, which forces the glass components, plasticized by heating, simultaneously in the direction of the discharge opening of the die. The sphere or disk of core glass is placed such that in the center of the discharge strand of glass a strand of core glass is formed, enclosed by a sheath of cladding glass. This method is important, for example, for the manufacture of semi-finished products which can subsequently be drawn to form composite fibres for optical data transmission.

Considering the said application, severe requirements must be imposed as regards the quality of the glass rods consisting of core and sheath which are used to manufacture ultimately fibres having a very small diameter (in the $\mu$um range) in various successive drawing or extrusion processes. First of all, it must be ensured that the geometric configuration of the core glass and the cladding glass does not change over the length of the fibres to be ultimately manufactured; furthermore, the desired dimensional relationships, for example, the ratio between core diameter and sheath diameter, must remain constant over the length of the fibres; in addition, there must be an absolute contact between the core glass and the cladding glass throughout the entire fibre; for example, no air bubbles may be present between core glass and cladding glass, because otherwise the optical properties of the ultimate light-conductive fibres will be adversely affected.

These properties are essentially influenced by the extrusion process whereby the semi-finished product is manufactured, for example, composite glass rods consisting of core glass and cladding glass for drawing into light-conductive fibres.

Moreover, the physical properties of the kinds of glass to be processed are also important, for example, the behaviour in reaction to expansion by heating or the crystallization tendency; in this respect those skilled in the art have some freedom in the choice of the suitable kinds of glass.

The method described in the said British Patent Specification was found to have a drawback in that the ratio between core diameter and sheath diameter and also the absolutely centered position of the core with respect to the sheath remain constant only over small portions of the glass rods manufactured by extrusion. In other words, using the method described in the said British Patent Specification it is difficult to obtain long glass rods, i.e. having a length of up to about 1 meter, of the required quality.

One of the causes of the drawbacks of the said method could be found in the geometric shape of the core glass introduced into the reservoir. The original spherical or disk-like shape is only gradually changed into the ultimately desired shape of a strand which should have a constant diameter in the cladding glass. Deviations in the diameter of the core over the total length of the extruded strand cannot be avoided when this method is used.

The object of the method according to the invention is to eliminate these drawbacks during the extrusion of a material consisting of two components, and being subject to very severe requirements as regards relative geometric position and dimensional accuracy.

According to the invention, a block of the material to be processed consists of at least two components having different properties, the relative position and the geometry thereof being comparable to the position and the geometry in the ultimate extruded product, and the block is subjected to an extrusion pressure which has a direction opposing the discharge direction of the extruded product.

Preferred embodiments according to the invention, notably a device for performing the method according to the invention, are described in the Claims.

Using the method according to the invention, composite bodies can be manufactured which have constant dimensions and a uniform geometry also over large lengths of approximately 1 meter. The method according to the invention is advantageous notably for the manufacture of glass fibres for optical data transmission, because the high quality of the extruded product results in a low rejection percentage, so that the major part of the expensive kinds of glass can actually be used for the ultimate fibre manufacture.

One embodiment according to the invention is shown in the drawing and will be described in detail hereinafter.

The FIGURE is a cross-sectional view of a device for performing the method according to the invention.

A glass block 34 is arranged in a block holder 2 in a reservoir 1. The block 34 is composed of a cylindrical body 3 consisting of cladding glass, wherein a rod-shaped body 4 of core glass, is concentrically arranged. The ratio between the diameters of the two glass bodies 3 and 4, whose surfaces should be clean and polished, determines the type of glass fibre to be ultimately manufactured. After the glass block 34 has been arranged in the block holder 2 against a closed end 22 of the holder, it is heated by means of a high-frequency induction coil 7. At the same time, the reservoir 1 is evacuated via a connection 9 so as to avoid gas bubbles at the interface of the two glass bodies, the said gas bubbles being liable to cause dispersion of the light in the fibre at a later stage. If necessary or if desired, a protective gas, for example, an inert gas, can be introduced into the reservoir via a connection 11. Subsequently, the glass block 34 is extruded to form a strand 6, a hollow extrusion ram 5, comprising a discharge duct 51, and a die 55, comprising a discharge opening 56, are pressed into the block holder 2 toward the closed end 22 such that the glass block 34 plasticized by heating is compressed in the direction opposite the discharge direction of the glass strand 6.

Because the core glass in the form of a rod 4 is concentrically arranged in the cylindrical body 3 of cladding glass, so that it already has a geometric configuration corresponding to the desired configuration in the ultimate product (the glass strand 6), deviations in the diameter ratio of core glass and jacket glass of the glass strand remain within narrow limits of 1% or less. Using a device according to the invention, a glass strand having a length of 90 cm and a diameter of 6.35 mm was extruded, the variations of the core diameter being limited to a maximum of ± 1% over a length of 60 cm.

For this embodiment the manufacture of multicomponent glass strands was described; obviously, for the manufacture of composite bodies by extrusion other materials can be used in the same manner, for example, combinations of the same materials having different properties, for example, metal/metal or synthetic material/synthetic material or also combinations of these materials such as, for example, metal/glass, metal/synthetic material or metal/ceramic, material.

What is claimed is:

1. A method of producing an optical fibre by extruding close tolerance multi-component coaxial material, comprising the sequential steps of forming a circular cylindrical body of inorganic glass sheath cladding material having a coaxial circular cylindrical bore, and placing a circular cylindrical body of inorganic glass core material in said bore, said bodies as placed together being a block of material to be extruded, said cladding and core materials having different properties, with said components arranged in relative position and geometry the same as that desired in the finished product; placing the block of material in a block holder in an extruding press having the block holder and an extrusion die aligned coaxially with the block of material; heating said block of material to a plastic state before applying said extruding pressure; and then extruding said material by applying extruding pressure to the extrusion die so as to move the die with respect to the block holder in a direction opposite the discharge direction of the extruded material, thereby producing an extruded rod having a constant ratio of core diameter to sheath diameter along the rod length and drawing said rod into an optical fibre.

2. A method as claimed in claim 1 comprising in addition the step of evacuating air from around said block of material after said step of placing the block in the holder and before completion of said heating step.

3. A method as claimed in claim 2 wherein said heating step comprises heating by a high frequency induction coil.

4. A method as claimed in claim 2 comprising in addition the step of introducing a protective gas around said block of material after evacuating and prior to said extruding step.

* * * * *